United States Patent [19]
Campbell et al.

[11] 3,821,072
[45] June 28, 1974

[54] LAMINATING PROCESS AND ARTICLE PRODUCED THEREBY

[75] Inventors: Robert W. Campbell; Oren L. Marrs, both of Bartlesville, Okla.

[73] Assignee: Phillips Petroleum Company, Bartlesville, Okla.

[22] Filed: July 5, 1972

[21] Appl. No.: 269,097

[52] U.S. Cl.............. 161/214, 156/331, 161/227
[51] Int. Cl..................... B32b 27/34, B32b 15/08
[58] Field of Search............ 161/214, 227; 156/331

[56] References Cited
UNITED STATES PATENTS

| | | | |
|---|---|---|---|
| 3,393,210 | 7/1968 | Speck | 260/78 R |
| 3,462,337 | 8/1969 | Gorton | 161/186 X |
| 3,492,270 | 1/1970 | Parish | 161/214 X |
| 3,539,619 | 11/1970 | Steitz | 260/78 R |
| 3,554,966 | 1/1971 | Jones et al. | 260/78 R |
| 3,582,458 | 6/1971 | Haller | 161/214 X |
| 3,738,950 | 6/1973 | Sturwold et al. | 161/227 X |
| R27,748 | 9/1973 | Peerman et al. | 161/227 X |

*Primary Examiner*—Harold Ansher
*Attorney, Agent, or Firm*—Donald J. Quigg

[57] ABSTRACT

Adhesives useful for uniting the surfaces of various elements are provided comprising a substantially amorphous polyamide or poly(amide-imide) prepared by polymerization of at least one of bis(4-aminocyclohexyl)methane (PACM) or 2,2-bis(4-aminocyclohexyl)propane (PACP) or methyl derivatives thereof with at least one polycarboxylic acid or a crystalline polymer of bis(4-aminocyclohexyl)methane (PACM) and azelaic acid. The polymeric compositions can be applied to surfaces as a hot melt adhesive or solvent cement.

20 Claims, No Drawings

LAMINATING PROCESS AND ARTICLE PRODUCED THEREBY

This invention relates to adhesive compositions and to structures having surfaces adhesively joined together therewith. In accordance with one aspect, this invention relates to adhesive compositions comprising a substantially amorphous polyamide or poly(amide-imide) prepared by polymerization of at least one of bis(4-aminocyclohexyl)methane or 2,2-bis(4-aminocyclohexyl)-propane or methyl derivatives thereof with at least one polycarboxylic acid. In accordance with another aspect, a crystalline polymer of bis(4-aminocyclohexyl)methane (PACM) and azelaic acid is provided as an adhesive for bonding various structures together. In accordance with another aspect, this invention relates to a method for uniting surfaces of various elements by application of s substantially amorphous polyamide or poly(amide-imide) or a crystalline PACM-9, which is a polyamide of PACM and azelaic acid. In accordance with a further aspect, this invention relates to the bonding together of a plurality of metallic surfaces by a polymeric composition comprising an amorphous polyamide or poly(amide-imide) or a crystalline polyamide of PACM and azelaic acid.

Adhesive compositions comprising various synthetic polymeric materials are old in the art. Additionally, the known adhesives have been used fairly extensively for adhering one metal substrate to another metal substrate or to some other type of substrate such as wood, glass, leather, plastic, and so forth. Some of the known compositions provide reasonably good bond strengths at room temperature and thus are satisfactory for some purposes. However, most known prior art compositions do not retain satisfactory bond strengths when the adhered substrates are subjected to elevated temperatures, especially when subjected to elevated temperatures in a moisture-laden atmosphere or when directly contacted with hot or boiling water.

One of the more significant developments in adhesive technology in recent years has occurred in the area of hot melt adhesives. Growth in the use of hot melt systems has been particularly marked by various segments of the packaging, bookbinding and shoe industries, as well as certain specialized areas of metal-to-metal bonding. Increased interest in hot melts has in turn encouraged development of special types of thermoplastic resins to serve as base constituents in commerical formulations.

In accordance with the invention, a class of amorphous polyamides and poly(amide-imide)s or a crystalline PACM-9 characterized by high strength stiffness, good high temperature properties, solvent resistance, and wet properties are provided which polymers have utility as adhesives for bonding various elements.

Accordingly, an object of this invention is to provide adhesive compositions which possess outstanding characteristics of flexibility and strength under widely varying conditions of temperature.

Another object of this invention is to provide adhesive compositions which display remarkable properties of stability and resistance to degradation.

A further object of this invention is to provide adhesive compositions which are characterized by their ability to adhere to a wide variety of substrates.

A further object of this invention is to provide a process for bonding substrates together to form a bond with good strength at elevated temperatures.

A still further object of this invention is to provide a process for bonding metal substrates together.

Other objects and aspects, as well as the several advantages of the invention, will be apparent to those skilled in the art upon reading the specification and the appended claims.

In accordance with the invention, compositions useful as adhesives are provided, which compositions comprise substantially amorphous polyamides or poly(amide-imide)s prepared by polymerization of at least one of bis(4-aminocyclohexyl)methane (PACM) or 2,2-bis(4-aminocyclohexyl)propane (PACP) or methyl derivatives thereof with at least one polycarboxylic acid or a crystalline PACM-9. The polymeric compositions of the invention are thermally stable at polymer melt temperatures.

Examples of such substantially amorphous polyamides and poly(amide-imide)s include the following, where the term "PACM" represents bis(4-aminocyclohexyl)methane as shown above, the expression "PACM or methyl derivative thereof" is used to represent diamines having the formula

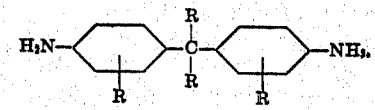

wherein each R is selected from hydrogen and methyl radicals, and the expression "PACP or methyl derivatives thereof," PACP being 2,2-bis(4-aminocyclohexyl)propane, is used to represent diamines having the formula

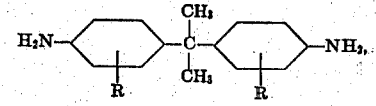

wherein each R is as defined above.

An example of a crystalline polymer according to the invention is the polyamide obtained from PACM and azelaic acid.

In accordance with one embodiment, amorphous copolyamides are produced by polymerization of at least one of bis(4-aminocyclohexyl)methane or methyl derivatives thereof with at least one of phenylindanedicarboxylic acid or alkyl derivatives thereof and at least one straight chain dicarboxylic acid having 6 to 18 carbon atoms. It is also within the scope of the invention to produce suitable amorphous polyamides by the polymerization of bis(4-aminocyclohexyl)methane or methyl derivatives thereof with phenylindanedicarboxylic acid or alkyl derivative thereof in the absence of a straight chain dicarboxylic acid.

In accordance with another embodiment, amorphous poly(amide-imide)s are produced by the polymerization of at least one of PACM or methyl derivative thereof with a mixture of at least one straight chain dicarboxylic acid having 6 to 18 carbon atoms and at least one tricarboxylic acid having the formula R"(CO$_2$H)$_3$, wherein R" is a trivalent saturated or aromatic hydrocarbon radical having 3 to 12 carbon atoms. The tricarboxylic acid can be used in an amount of about 5 to 60 mole percent of the total carboxylic acids employed.

In accordance with a further embodiment of the invention, amorphous polyamides are produced by the polymerization of PACM having a trans,trans isomer content of less than 40 percent of its total geometric isomers with at least one straight chain dicarboxylic acid having 6 to 18 carbon atoms, the average number of carbon atoms in the dicarboxylic acid(s) being at least 7.

In accordance with still another embodiment of the invention, amorphous polyamides are produced by the polymerization of PACM having a trans, trans isomer content of at least 40 percent with a mixture of about 45 to 75 mole percent dodecanedioic acid and about 25 to 55 mole percent suberic acid and/or azelaic acid.

Still further in accordance with the invention, suitable amorphous polyamides are produced by the polymerization of at least one of PACP or methyl derivative thereof with at least one straight chain dicarboxylic acid having 6 to 18 carbon atoms. The diamine can be used in the form of any one or more of its geometric isomers. Mixtures of diamines and/or acids can be employed.

In accordance with a further embodiment of the invention, a suitable crystalline polyamide is provided by polymerization of PACM having a trans,trans isomer content of at least 40 percent of its total geometric isomers with azelaic acid.

The bis(4-aminocyclohexyl)methane or methyl derivative thereof for use in this invention can be represented by the formula

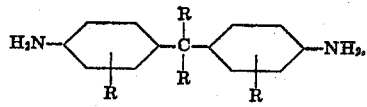

wherein each R is selected from hydrogen and methyl radicals. Mixtures of these diamines can be employed. Any of the geometric isomers or mixtures thereof can be employed, except when specified otherwise herein. Specific compounds that have been polymerized include bis(4-aminocyclohexyl)methane (PACM) or its methyl derivatives, e.g., 2,2-bis(4-aminocyclohexyl)-propane (PACP).

The phenylindanedicarboxylic acid or alkyl derivative thereof applicable in this invention can be represented by the formula

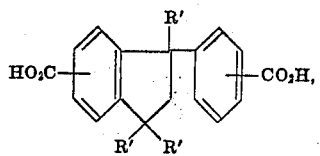

wherein each R' is selected from hydrogen and alkyl radicals having 1–3 carbon atoms. Mixtures of compounds represented by this formula can be employed. The compound of the above structure presently preferred for use in this invention is 1,1,3-tri-methyl-5-carboxy-3-(p-carboxyphenyl)indane.

The straight chain dicarboxylic acids having 6–18 carbon atoms which are applicable as a comonomer in the production of polyamides of this invention can be represented by the formula $HO_2C(CH_2)_xCO_2H$, wherein $x$ is an integer of 4–16, preferably 5–10, these preferred values of 5–10 representing average values of $x$ when mixtures of straight chain dicarboxylic acids are employed.

The straight chain dicarboxylic acids containing 6 to 18 carbon atoms include adipic acid, pimelic acid, suberic acid, azelaic acid, sebacic acid, undecanedioic acid, pentadecanedioic acid, dodecanedioic acid, tridecanedioic acid, tetradecanedioic acid, heptadecanedioic acid, octadecanedioic acid, and hexadecanedioic acid, and their mixtures.

Examples of some applicable tricarboxylic acids include 1,2,3-propanetricarboxylic acid, 1,2,4-butanetricarboxylic acid, 4-methyl-1,2,6-hexanetricarboxylic acid, 1,2,12-dodecanetricarboxylic acid, 1,2,4-cyclohexanetricarboxylic acid, 1,2,4-benzenetricarboxylic acid, and 6-ethyl-1,2,5-naphthalenetricarboxylic acid.

The polyamides and poly(amide-imide)s for use as the adhesives of this invention can be prepared by conventional polymerization procedures, e.g., by a melt polymerization process such as that described in U.S. Pat. No. 2,512,606. In the polymerization process, the molar ratio of carboxylic acid(s) to diamine(s) should be substantially 1:1, although a slight excess, e.g., up to about 5 mole percent of acid(s) or amine(s) can be used. The polymerization preferably is conducted at a temperature within the range of about 260°–340° C for about 2 to 6 hours; however, polymerization temperatures and reaction times outside these ranges can be employed. Water can be present to serve as a heat transfer agent and to aid in keeping the reactants in the reaction zone. Preferably the pressure is reduced as the polymerization progresses.

The polyamides and poly(amide-imide)s employed as adhesives in this invention are especially useful as hot melt adhesives which can be employed in conventional manner, e.g., application by an extrusion technique in which the molten polymer is allowed to flow on or between substrates to be bonded, or by application as a preformed film between substrates which are subjected to heating. The polyamides and poly(amide-imide)s employed as adhesives in this invention also can be used as solvent cements, in which the polymers dissolved in a suitable solvent are applied to substrates in conventional manner, with the bond produced as the solvent evaporates or with solvent evaporation followed by a thermal bond-forming operation. If desired, other substances known to have utility in adhesive formulations, e.g., resins such as olefin resins or terpene resins, waxes, plasticizers, fillers, pigments, and the like, can be present in the adhesive compositions. The adhesives can be used to bond a variety of like or unlike substrates, e.g., metals such as aluminum, iron, steel, e.g., carbon steel, zinc or tin; wood; paper; leather; plastic; and the like.

SPECIFIC EXAMPLES

Polyamides and poly(amide-imide)s derived from PACM or PACP for evaluation as hot melt adhesives were prepared in the following manner. A nearly equimolar mixture of diamine and carboxylic acid(s) was heated in the presence of 10 to 25 weight percent water, based on the total weight of monomers, in a stainless steel autoclave to a final temperature of about 320° C over a period of 2½ hours under a nitrogen atmosphere. The mixture was heated at this temperature for about one hour under a pressure of 300–600 psig, then for about ½ hour as volatile substances were vented, then for about ½ hour under a slow nitrogen flush, and finally for about 1½ hours under reduced pressure (usually 20 mm Hg). Molten polymer was extruded into an aqueous bath using nitrogen pressure. The remaining polymer was cooled to room temperature (about 25° C) in the reactor, combined with the quenched strands of extruded polymer, and chopped in a Wiley mill. The resulting polymer was applied in molten form between substrates to produce, upon cooling, a bond whose lap shear strength was evaluated at various temperatures. The values for lap shear strength are shown in Table I, together with values for inherent viscosity, glass transition temperature ($T_g$), and crystalline melting point ($T_m$) or polymer melt temperature (PMT). Also included in Table I are lap shear strength values for some commercial resins for hot melt adhesives similarly applied between substrates.

shear strength far superior to that shown by commercial resins for hot melt adhesives use. The lap shear strength data also demonstrate the superiority of PACM$_{(37)}$-12, which was amorphous, over PACM-12, and PACM$_{(73)}$-12, which exhibited crystallinity. PACM-9, a crystalline polymer within the scope of this invention, surprisingly was found to exhibit a lap shear strength much greater than either PACM-8 or PACM-12. Except for PACM-9, all of the polymers in Table I which are within the scope of the adhesives used in this invention were amorphous.

We claim:
1. A method for uniting surfaces of elements which comprises:
   a. applying to at least one of said surfaces an adhesive consisting essentially of a substantially amorphous polyamide or poly(amide-imide) prepared by polymerization of at least one of bis(4-aminocyclohexyl)methane or 2,2-bis(4-aminocyclohexyl)propane or methyl derivatives thereof with at least one polycarboxylic acid,
   b. holding said surfaces contiguous to one another with said polymeric composition disposed therebetween, and

TABLE I

| Sample No. | Polymer[a] | Inherent Viscosity[b] | $T_g$, °C[c] | $T_m$, °C[d] | Lap Shear Strength, psi[e] | | | |
|---|---|---|---|---|---|---|---|---|
| | | | | | 25°C | 120°C | 150°C | 200°C |
| I | PACM-9 | 1.09 | 147 | 250 | 2960 | — | 1582 | 560 |
| II | PACM$_{(37)}$-12 | 0.70 | 125 | (190) | 2605 | 2143 | 560 | — |
| III | PACP$_{(64)}$-8 | 0.91 | 176 | (240) | 3062 | — | — | — |
| IV | PACP$_{(64)}$-12 | 0.87 | 151 | (218) | 2866 | — | — | — |
| V | PACM-8/12 (50/50) | 1.05 | 147 | (205) | 3779 | 2607 | 1873 | 100 |
| VI | PACM-8/123P (75/25) | 0.90 | 159 | (235) | 2716 | 2147 | 2100 | — |
| VII | PACM-12/123P (75/25) | 1.13 | 145 | (215) | 3285 | 2410 | 400–1000 | — |
| VIII | PACM-8/PIDA (75/25) | 0.77 | 185 | (245) | 2933 | 2738 | 2327 | 1567 |
| IX | PACM-9/PIDA (75/25) | 0.90 | 182 | (250) | 780–2300 | 120–1560 | 1400 | — |
| X | PACM-12/PIDA (75/25) | 0.94 | 165 | (235) | 400–1240 | 1860 | 540–2152 | — |
| XI | PACM-9/PIDA (70/30) | 0.78 | 190 | (265) | 2817 | 2283 | 2190 | 1647 |
| XII | PACM-12/PIDA (70/30) | 0.87 | 174 | (235) | 3033 | 2516 | 2257 | 817 |
| XIII | PACM-8/PIDA (75/25) | 0.77 | 185 | (245) | 2380 | 2247 | 2220 | 1301 |
| XIV | PACM-8 (CONTROL) | 0.81 | 148 | 291 | Very brittle, poor bond | | | |
| XV | PACM-12 (CONTROL) | 1.09 | 131 | 262 | 2166 | 830 | — | — |
| XVI | PACM$_{(73)}$-12 (CONTROL) | 0.97 | 145 | 288 | No bond | | | |
| XVII | Polyamide Terpolymer[f] | — | — | — | 2075 | 900 | 375 | — |
| XVIII | Dimer acid-based polyamide[f] | — | — | — | 510 | — | — | — |
| XIX | Dimer acid-based polyamide[f] | — | — | — | 550 | — | — | — |
| XX | Specialty nylon resin[f] | — | — | — | 1794 | 753 | 349 | — |
| XXI | Polyester[f] | — | — | — | 1660 | 1527 | 1083 | 807 |
| XXII | Specialty nylon resin[f] | — | — | — | 2600 | 813 | 500 | 100 |
| XXIII | Polyester[f] | — | — | — | 957 | 713 | 500 | 303 |

[a]Polyamides and poly(amide-imide)s prepared from PACM or PACP are designated in the following manner. The amine employed in the preparation of the polymer is shown on the left of the hyphen. In each instance the amine was either bis(4-aminocyclohexyl)methane, designated as PACM, or 2,2-bis(4-aminocyclohexyl)propane, designated as PACP. A subscript following PACM or PACP represents the percent trans,trans isomer content in the amine used. When no subscript follows PACM, the trans,trans isomer content in the amine was 54 percent. The acid or acids employed in the preparation of the polymer are shown on the right of the hyphen. When more than one acid was used, the mole ratio of the acids employed is shown in parentheses following the designation of the acids. The acids used were suberic acid, azelaic acid, and dodecanedioic acid, designated by the numbers 8, 9, and 12, respectively; 1,2,3-propanetricarboxylic acid, designated as 123P; and 1,1,3-trimethyl-5-carboxy-3-(p-carboxyphenyl)indane, designated as PIDA. For example, PACM-8/PIDA (75/25) represents a polyamide produced by the polymerization of PACM having a trans,trans isomer content of 54 percent with a mixture of suberic acid and PIDA in a mole ratio of 75 to 25, respectively.
[b]Measured at 30°C on m-cresol solutions having a polymer concentration of 0.5 g/100 ml solution.
[c]Determined by differential thermal analysis.
[d]Values for $T_m$, shown without use of parentheses, were determined by differential thermal analysis. When no $T_m$ was thereby detectable, thus indicating the polymer to be amorphous, the value for PMT was determined by placing the polymer sample on a heated bar with a temperature gradient. All values shown in parentheses are values for PMT for polymers exhibiting no $T_m$.
[e]ASTM D 1002-64. Values are for aluminum-to-aluminum bonding except for Examples XIII, XXII, and XXIII, in which values are for carbon steel-to-carbon steel bonding. Use of a dash to represent lap shear strength indicates test was not conducted.
[f]Commercial resins for hot melt adhesives.

In Table I Samples I, II, and III–XIII represent the use of polyamides and poly(amide-imide)s as hot melt adhesives within the scope of this invention. Samples XIV, XV, XVI, and XVII–XXIII represent the use of other polymers as hot melt adhesives outside the scope of this invention. As shown by the lap shear strength data, the adhesives within the scope of this invention performed quite well, in some instances exhibiting lap c. allowing said composition to bond to said surfaces and form a structure having good lap shear strength.

2. A method for uniting surfaces of elements according to claim 1 which comprises:
   a. applying at least one of said surfaces an amorphous polymeric composition consisitng essentially of the product formed by:

1. polymerizing at least one of bis(4-aminocyclohexyl)methane and methyl derivatives thereof with at least one of phenylindanedicarboxylic acid or alkyl derivatives thereof having the formula

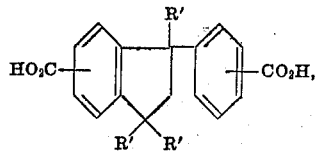

wherein each R' is selected from hydrogen and alkyl radicals having 1 to 3 carbon atoms, and optionally with at least one straight chain dicarboxylic acid having from 6 to 18 carbon atoms, or 2. polymerizing at least one of bis(4-aminocyclohexyl)methane and methyl derivatives thereof with a mixture of at least one straight chain dicarboxylic acid having 6 to 18 carbon atoms and at least one tricarboxylic acid having the formula $R''(CO_2H)_3$ wherein $R''$ is a trivalent saturated or aromatic hydrocarbon radical having 3 to 12 carbon atoms with the further proviso that the tricarboxylic acid is used in an amount of about 5 to 60 mole percent of the total carboxylic acids employed, or 3. polymerizing bis(4-aminocyclohexyl)methane having a trans,trans isomer content of less than 40 percent of its total geometric isomers with at least one straight chain dicarboxylic acid having 6 to 18 carbon atoms, the average number of carbon atoms in the dicarboxylic acids being at least 7, or 4. polymerizing bis(4-aminocyclohexyl)methane having a trans,trans isomer content of at least 40 percent with a mixture of about 45 to 75 mole percent dodecanedioic acid and about 25 to 55 mole percent suberic acid and/or azelaic acid, or 5. polymerizing at least one of 2,2-bis(4-aminocyclohexyl)propane and methyl derivatives thereof with at least one straight chain dicarboxylic acid having 6 to 18 carbon atoms.

3. A method according to claim 1 wherein said polymeric composition is applied to said surfaces as a hot melt and is allowed to cool to bond said surfaces.

4. A method according to claim 1 wherein said elements are metallic.

5. A method according to claim 2 wherein the polymeric composition is prepared as in (1) and is formed by reacting bis(4-aminocyclohexyl)methane with 1,1,-3-trimethyl-5-carboxy-3-(p-carboxyphenyl)indane and with either suberic acid, azelaic acid or dodecanedioic acid.

6. A method according to claim 2 wherein the polymeric composition is prepared as in (2) and is the reaction product of bis(4-aminocyclohexyl)-methane with 1,2,3-propanetricarboxylic acid and with either suberic acid or dodecanedioic acid.

7. A method according to claim 2 wherein the polymeric composition is prepared as in (3) and is the reaction product of bis(4-aminocyclohexyl)-methane having a trans,trans isomer content of less than 40 percent with dodecanedioic acid.

8. A method according to claim 2 wherein the polymeric composition is prepared as in (4) and is the reaction product of bis(4-aminocyclohexyl)-methane and a mixture of suberic and dodecanedioic acid.

9. A method according to claim 2 wherein the polymeric composition is prepared as in (5) and is the reaction product of 2,2-bis(4-aminocyclohexyl)propane with either suberic acid or dodecanedioic acid.

10. A method for uniting surfaces of elements which comprises:
a. applying to at least one of said surfaces an adhesive consisting essentially of a crystalline polymer obtained by polymerizing bis(4-aminocyclohexyl)methane having a trans,trans isomer content of at least 40 percent of its total geometric isomers with azelaic acid,
b. holding said surfaces contiguous to one another with said polymeric composition disposed therebetween, and
c. allowing said composition to bond to said surfaces and form a structure having good lap shear strength.

11. A plurality of layers having a polymeric composition consisting essentially of a substantially amorphous polyamide or poly(amide-imide) prepared by polymerization of at least one of bis(4-aminocyclohexyl)methane or 2,2-bis(4-aminocyclohexyl)propane or methyl derivatives thereof with at least one polycarboxylic acid between adjacent surfaces thereof as a bonding material therefor.

12. A plurality of layers according to claim 11 having a polymeric composition consisting essentially of an amorphous polyamide or poly(amide-imide) between adjacent surfaces thereof as a bonding material therefor, said polymeric composition being prepared by
1. polymerizing at least one of bis(4-aminocyclohexyl)methane and methyl derivatives thereof with at least one of phenylindanedicarboxylic acid or alkyl derivatives thereof having the formula

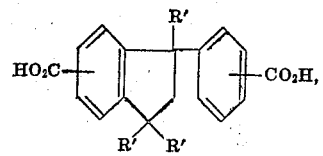

wherein each R' is selected from hydrogen and alkyl radicals having 1 to 3 carbon atoms, and optionally with at least one straight chain dicarboxylic acid having from 6 to 18 carbon atoms, or 2. polymerizing at least one of bis(4-aminocyclohexyl)methane and methyl derivatives thereof with a mixture of at least one straight chain dicarboxylic acid having 6 to 18 carbon atoms and at least one tricarboxylic acid having the formula $R''(CO_2H)_3$ wherein $R''$ is a trivalent saturated or aromatic hydrocarbon radical having 3 to 12 carbon atoms with the further proviso that the tricarboxylic acid is used in an amount of about 5 to 60 mole percent of the total carboxylic acids employed, or 3. polymerizing bis(4-aminocyclohexyl)methane having a trans,trans isomer content of less than 40 percent of its total geometric isomers with at least one straight chain dicarboxylic acid having 6 to 18 carbon atoms, the average number of carbon atoms in the dicarboxylic acids being at least 7, or 4. polymerizing bis(4-aminocyclohexyl)methane having a trans,trans isomer content of at least 40 percent with a mixture of about 45 to 75 mole percent dodecanedioic acid and about 25 to 55 mole percent suberic acid and/or azelaic acid, or 5. polymerizing at least one of 2,2-bis(4-aminocyclohexyl)propane and methyl derivatives thereof with at least one straight chain dicarboxylic acid having 6 to 18 carbon atoms.

13. An article of manufacture according to claim 11 wherein the layers are metal.

14. An article of manufacture according to claim 12 wherein said polymeric composition is prepared as in (1) and is formed by reacting bis-(4-aminocyclohexyl)methane with 1,1,3-trimethyl-5-carboxy-3-(p-carboxyphenyl)indane and with either suberic acid, azelaic acid or dodecanedioic acid.

15. An article of manufacture according to claim 12 wherein said polymeric composition is prepared as in (2) and is the reaction product of bis(4-aminocyclohexyl)methane with 1,2,3-propanetricarboxylic acid and with either suberic acid or dodecanedioic acid.

16. An article of manufacture according to claim 12 wherein said polymeric composition is prepared as in (3) and is the reaction product of bis(4-aminocyclohexyl)methane having a trans,trans isomer content of less than 40 percent with dodecanedioic acid.

17. An article of manufacture according to claim 12 wherein said polymeric composition is prepared as in (4) and is the reaction product of bis(4-aminocyclohexyl)methane and a mixture of suberic and dodecanedioic acid.

18. An article of manufacture according to claim 12 wherein said polymeric composition is prepared as in (5) and is the reaction product of 2,2-bis(4-aminocyclohexyl)propane with either suberic acid or dodecanedioic acid.

19. A plurality of layers having a polymeric composition consisting essentially of a crystalline polymer obtained by polymerizing bis(4-aminocyclohexyl)methane having a trans,trans isomer content of at least 40 percent of its total geometric isomers with azelaic acid between adjacent surfaces thereof as a bonding material therefor.

20. An article of manufacture according to claim 19 wherein the layers are metal.

* * * * *